US009146318B2

(12) United States Patent
Kim

(10) Patent No.: US 9,146,318 B2
(45) Date of Patent: Sep. 29, 2015

(54) PSEUDO-SATELLITE TRANSMITTER AND METHOD OF TRANSMITTING GPS SIGNALS USING PSEUDO-SATELLITE TRANSMITTER

(71) Applicant: SAMSUNG ELECTRONICS CO., LTD., Suwon-si, Gyeonggi-do (KR)

(72) Inventor: Wan-Jin Kim, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 27 days.

(21) Appl. No.: 14/100,424

(22) Filed: Dec. 9, 2013

(65) Prior Publication Data

US 2014/0097985 A1 Apr. 10, 2014

Related U.S. Application Data

(62) Division of application No. 12/652,339, filed on Jan. 5, 2010, now Pat. No. 8,618,979.

(30) Foreign Application Priority Data

Jan. 9, 2009 (KR) ........................ 10-2009-0001787

(51) Int. Cl.
*G01S 19/02* (2010.01)
*G01S 19/11* (2010.01)

(52) U.S. Cl.
CPC *G01S 19/02* (2013.01); *G01S 19/11* (2013.01)

(58) Field of Classification Search
CPC .......... G01S 19/02; G01S 19/08; G01S 19/11
USPC ........... 342/357.21, 357.31, 357.395, 357.48, 342/357.74; 701/468, 470
See application file for complete search history.

(56) References Cited

U.S. PATENT DOCUMENTS

| | | | | |
|---|---|---|---|---|
| 7,142,159 B1 * | 11/2006 | Farley | ............................ | 342/386 |
| 2005/0030229 A1 * | 2/2005 | Spilker, Jr. | .................... | 342/385 |
| 2006/0234717 A1 | 10/2006 | Pun | | |

FOREIGN PATENT DOCUMENTS

| | | |
|---|---|---|
| JP | 11-074804 | 3/1999 |
| JP | 2003-309505 | 10/2003 |
| JP | 2007-212162 | 8/2007 |
| KR | 20-03223265 | 8/2003 |
| KR | 1020040080713 | 9/2004 |

* cited by examiner

*Primary Examiner* — Dao Phan
(74) *Attorney, Agent, or Firm* — F. Chau & Associates, LLC

(57) ABSTRACT

A method of transmitting GPS signals of a pseudo-satellite includes: enabling a GPS unit of a pseudo-satellite transmitter to generate a GPS signal; enabling a transmission power control unit to generate a plurality of GPS signals with different power levels based on the GPS signal and power determination values of a plurality of reception areas; and transmitting the GPS signals with different power levels to the plurality of reception areas through a plurality of different antennas.

6 Claims, 4 Drawing Sheets and was opened to the public in 1984. By the early 2000s, the number of GPS users had rapidly increased and the GPS had become part of vehicle navigation systems and location-based services (LBS). LBS is an information and entertainment service, accessible with mobile devices through the mobile network and utilizing the ability to make use of the geographical position of the mobile device. LBS can include mobile commerce when taking the form of coupons or advertising directed at customers based on their current location, personalized weather services, location-based games etc.

PSEUDO-SATELLITE TRANSMITTER AND METHOD OF TRANSMITTING GPS SIGNALS USING PSEUDO-SATELLITE TRANSMITTER

CROSS-REFERENCE TO RELATED APPLICATIONS

This application is a divisional application of co-pending U.S. application Ser. No. 12/652,339 filed Jan. 5, 2010, which claims priority to Korean Patent Application 10-2009-0001787, filed on Jan. 9, 2009, in the Korean Intellectual Property Office, the disclosures of which are each incorporated by reference herein in their entireties.

BACKGROUND

1. Technical Field

Exemplary embodiments of the present invention relate to a pseudo-satellite transmitter and a method of transmitting GPS signals using a pseudo-satellite transmitter.

2. Discussion of Related Art

A global positioning system (GPS) is a navigation satellite system that provides reliable positioning, navigation, and timing services to worldwide users on a continuous basis. A receiver of a GPS system calculates its position by timing the signals sent by GPS satellites high above the Earth. Each satellite continually transmits messages which may include the time the message was sent, orbital information, general system health, rough orbits of all GPS satellites, etc. The GPS receiver utilizes the messages it receives to determine the transit time of each message and computes the distances to each satellite.

GPS has been used by the U.S. Navy since the early 1970s and was opened to the public in 1984. By the early 2000s, the number of GPS users had rapidly increased and the GPS had become part of vehicle navigation systems and location-based services (LBS). LBS is an information and entertainment service, accessible with mobile devices through the mobile network and utilizing the ability to make use of the geographical position of the mobile device. LBS can include mobile commerce when taking the form of coupons or advertising directed at customers based on their current location, personalized weather services, location-based games etc.

However, GPS is limited to the environment in which the GPS receiver is located. For example, obstructions and interferences in the environment between the GPS receiver and the satellites may prevent the GPS receiver from receiving the signals it needs and at the quality level required to perform calculations. A GPS receiver typically needs to receive four or more GPS satellite signals to determine the coordinates of a three-dimensional position. If one or more of these signals is not received, the GPS receiver may be able compensate for the missing information by utilizing other information that is present.

For example, a GPS receiver may make use of information provided from a pseudo-satellite in a shadow area. The shadow area is an area where three or less signals are received or the quality of the received signal is poor due to a bad reception environment. A base station that transmits GPS signals, such as GPS satellite signals, to the shadow area is called the pseudo-satellite.

The signals transmitted from the GPS satellites are based on a Code division multiple access (CDMA) system where an orthogonal code of each signal is used to discriminate a satellite ID. CDMA signals share a frequency and time. Therefore, when all the received signals do not have the same power level, interference between a signal with a weak power level and a signal with a strong power level occurs, which is called the near-far problem.

Since all of the GPS satellites are disposed at similar heights (e.g., about 25,000 Km from the ground), there is little variation in the intensity of the received signal. Therefore, the near-far problem does not arise. However, when the pseudo-satellite is used, the base station is disposed at a height which is quite different from that of the actual GPS satellites (e.g., several tens of meters to several hundreds of meters). Therefore, there is a large variation in the intensity of the received signal from the pseudo-satellite as compared to the signals from the actual GPS satellites.

Thus, there is a need for a GPS system that is capable of interfacing with a pseudo-satellite that can improve GPS calculations using GPS signals from GPS satellites and pseudo-satellites, and devices and methods for implementing the GPS system.

SUMMARY

A pseudo-satellite transmitter according to an exemplary embodiment of the inventive concept includes a GPS unit, a transmission power control unit, and a plurality of antennas. The GPS unit generates a GPS signal of a pseudo-satellite. The transmission power control unit generates a plurality of GPS signals having different power levels from the GPS signal generated by the GPS unit and a distance from a shadow area to the pseudo-satellite transmitter. Each of the antennas is configured to wirelessly transmit the GPS signals with different power levels output from the transmission power control unit to a corresponding one of a plurality of shadow areas according to the distance from the shadow area to the corresponding antenna. The pseudo-satellite transmitter may further include a control unit generating a control signal in response to an external signal, where the GPS unit transmits the GPS signal in response to a control signal.

The multiple antennas may be annular antennas having a laminated structure of a plurality of antennas. The annular antennas may include a first antenna (e.g., a weak power antenna) wirelessly transmitting the GPS signal with a first power level (e.g., a weak power level), a second antenna (e.g., a medium power antenna) wirelessly transmitting the GPS signal with a second power level (e.g., a medium power level), and a third antenna (e.g., a strong power antenna) wirelessly transmitting the GPS signal with a third power level (e.g., a strong power level). The multiple antennas may be directional antennas that locally transmit the GPS signals only to a GPS shadow area.

A method of sending GPS signals from a pseudo-satellite transmitter according to an exemplary embodiment of the inventive concept includes dividing, by the pseudo-satellite transmitter, a reception area of a plurality of antennas into a plurality of divided areas at a predetermined distance interval from a transmission position of the antennas, and transmitting, by the pseudo-satellite transmitter, a GPS signal representative of the location of the pseudo-satellite transmitter from each antenna such that an electric field intensity of each of the divided areas are equal or similar to each other.

The antennas may be co-located in a lateral direction over the transmission position. The divided areas may be annular and arranged concentrically around the transmission position. The lateral direction may be the vertical direction. The antennas may be directional antennas and the divided areas may be annular and non-overlapping.

A method of transmitting GPS signals of a pseudo-satellite according to an exemplary embodiment of the inventive concept includes enabling a GPS unit of a pseudo-satellite transmitter to generate a GPS signal, enabling a transmission power control unit of the pseudo-satellite transmitter to generate a plurality of GPS signals with different power levels based on the GPS signal and power determination values of a plurality of reception areas, and transmitting the GPS signals with different power levels to the plurality of reception areas through a plurality of different antennas.

The transmitting may include transmitting a GPS signal of the plurality having the lowest power level to the reception area of lowest area, and transmitting each subsequent GPS signal of a next higher power level to the next reception area of the next higher area. Alternately, when the antennas are directional antennas, the transmitting may include transmitting all the GPS signals by each antenna to a respective one of the reception areas that do not overlap with one another.

BRIEF DESCRIPTION OF THE DRAWINGS

The inventive concept will become more apparent by describing in detail exemplary embodiments thereof with reference to the attached drawings in which.

DETAILED DESCRIPTION OF THE EMBODIMENTS

Exemplary embodiments of the inventive concept will now be described more fully with reference to the accompanying drawings. Inventions based on the inventive concept may, however, be embodied in many different forms and should not be construed as limited to the exemplary embodiments set forth herein. Like numbers refer to like elements throughout the description of the figures.

It will be understood that when an element is referred to as being "connected" or "coupled" to another element, it can be directly connected or coupled to the other element or intervening elements may be present. Hereinafter, a pseudo-satellite transmitter and a method of transmitting GPS signals using a pseudo-satellite transmitter according to exemplary embodiments of the inventive concept will be described in detail with reference to the accompanying drawings.

Figure 1:
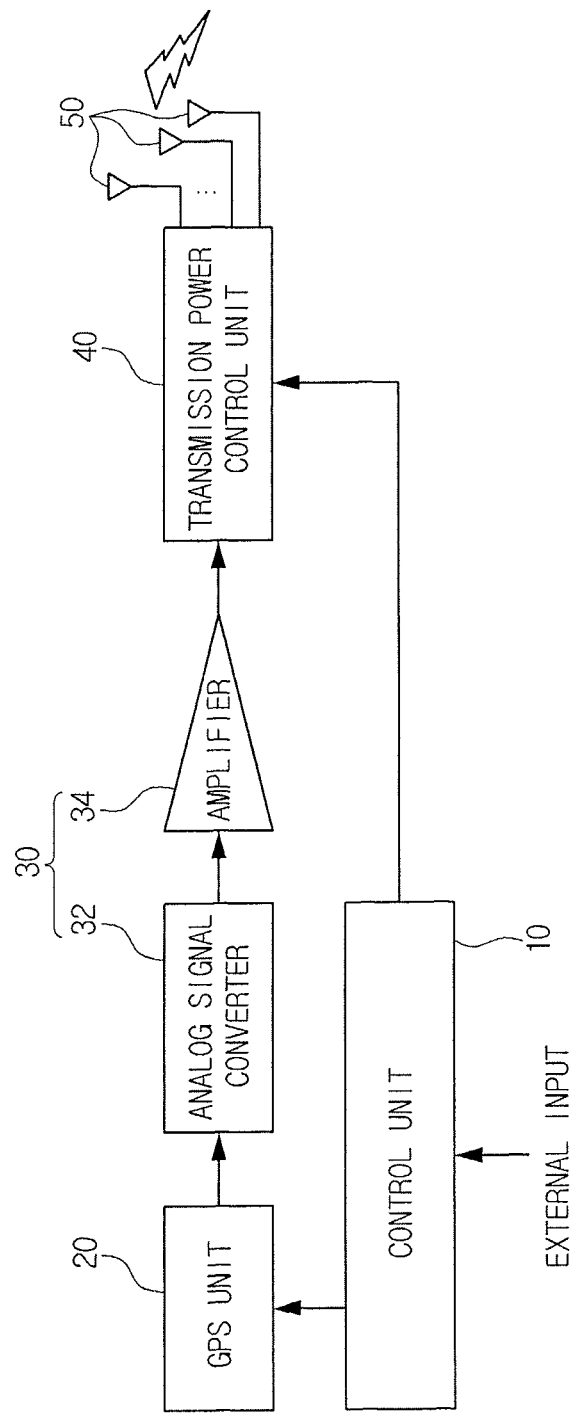
FIG. 1 is a block diagram schematically illustrating a pseudo-satellite transmitter according to an exemplary embodiment of the inventive concept.

FIG. 1 is a block diagram schematically illustrating a pseudo-satellite transmitter according to an exemplary embodiment of the inventive concept. As shown in FIG. 1, the pseudo-satellite transmitter includes multiple antennas 50 that wirelessly transmit GPS signals with different power levels and a transmission power control unit 40 that generates the GPS signals with the different power levels according to a distance or position of a GPS shadow area relative to the pseudo-satellite transmitter or an antenna thereof and outputs them to the multiple antennas 50.

The transmission power control unit 40 may generate the GPS signals with the different power levels in response to a control signal from a control unit 10, which may be controlled in response to an external input signal, a central processing unit, etc. The control unit 10 may output a control signal to a GPS unit 20 and control the transmission power control unit 40 to generate GPS signals with multiple power levels. The GPS unit 20 may output one or more GPS signals including positional information (e.g., latitude and longitude) and temporal information (e.g., a time that the positional information is sent) of the pseudo-satellite at a predetermined time interval according to a universal communication protocol. For example, the GPS unit 20 may output information at a transmission rate of about 50 bps or more. The GPS unit 20 may include a high-precision clock (not shown), such as an atomic clock or a quartz clock, which may be used to notify a GPS receiver (not shown) of the current time. The pseudo-satellite transmitter or a particular element of the transmitter such as the GPS unit 20 may further include a memory (not shown) that stores power determination values from the multiple antennas 50 to reception areas.

The GPS receiver can detect the position, the movement distance, and the moving speed of an object from information output from the GPS unit 20 using at least one of a trigonometrically function, a polar coordinate system, and a spherical coordinate system. The GPS receiver may calculate a time difference during movement and divide a movement distance by the time difference to calculate a moving speed of the object. The GPS receiver can detect these data from GPS signals output by actual GPS satellites and from the information output from the pseudo-satellite.

The positional information and temporal information output from the GPS unit 20 may be modulated or encoded for wireless transmission. A signal processing unit 30 including an analog signal converter 32 may signal process the positional information and temporal information. The signal processing may include an operation of processing (e.g., encoding) the positional information and temporal information into a coarse/acquisition code (C/A) or a standard code, which is a civil communication navigation message, or a precision code (P code) for military purposes. The P code is combined with other unpublished codes and is then encoded. An algorithm for encoding the combination of the P code and the unpublished codes may be provided in the signal processing unit 30. The C/A code and the P code may be output at a bit rate of 1.023 Mbps and a bit rate of 10.23 Mbps, respectively. The above-mentioned information may be carried on a carrier wave and the carrier wave with the information may be modulated by the signal processing unit 30. In addition, the signal output from the analog signal converter 32 may be amplified by an amplifier 34 and the amplified signal may be output to the transmission power control unit 40.

Therefore, the transmission power control unit 40 may supply GPS signals with different power levels to the multiple antennas 50. The reception sensitivity of a signal received by a GPS receiver is reduced as the distance of the GPS receiver from the multiple antennas 50 is increased. This is because the signal is radially transmitted from the multiple antennas 50 in all directions or it is attenuated while propagating through the air. The attenuation of the signal may be proportional to the reciprocal of an exponential function of the distance. Power that is proportional to the exponential function may be supplied to the multiple antennas 50 considering the loss of power during the propagation of signals. In this way, reception sensitivity may be obtained that does not depend on the position of the GPS receiver. Therefore, in an exemplary embodiment of the inventive concept, the transmission power control unit 40 may output a signal whose power is proportional to an exponential function having a reception distance as a variable.

The multiple antennas 50 may be designed such that transmission signals are received by a GPS receiver with the same or similar electric field intensity regardless of the reception distance, which will be described below.

Figure 2:
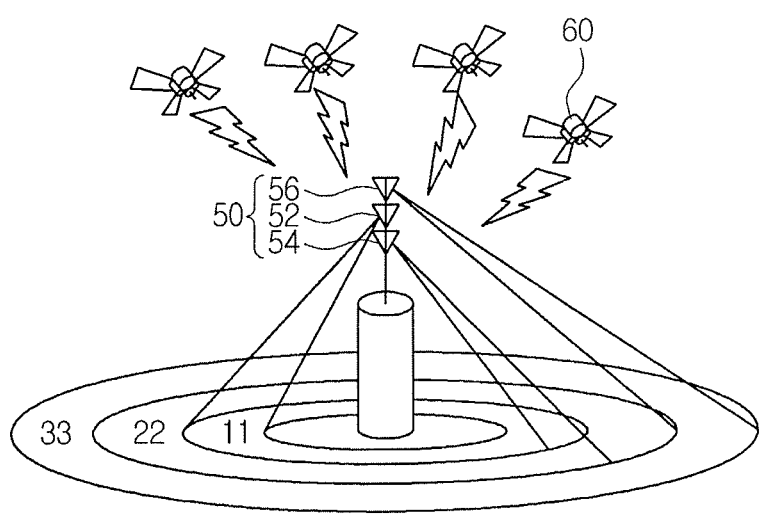
FIG. 2 is a diagram illustrating the operation of multiple antennas according to an exemplary embodiment of the inventive concept.

FIG. 2 is a diagram illustrating an operation of the multiple antennas 50 according to an exemplary embodiment of the inventive concept. Referring to FIG. 2, the multiple antennas 50 transmit GPS signals whose power is gradually increased to a plurality of annular reception areas (that is, GPS shadow areas) that are annular and are arranged concentrically around the position where the pseudo-satellite transmitter is provided. For example, the annual area with the smallest area (e.g., 11) receives a GPS signal of a lowest power level, the annual area of the next higher area (e.g., 22) receives a GPS signal of a next higher power level, and the annual area of the highest area (e.g., 33) receives a GPS signal of the highest power level.

The multiple antennas 50 may include an annular antenna, a pattern antenna, a patch antenna, an annular slot antenna having a laminated structure of several antennas, etc. The structure of the annular slot antenna may be embodied as that shown in U.S. Pat. No. 4,547,779, in which a microstrip annular antenna structure is formed by four quarter-wavelength microstrip radiator patches arranged in a quadrant formation and having outwardly directed adjacent radiating apertures which together provide a composite annular radiating slot extending about 360° of azimuth.

The multiple antennas 50 may transmit the GPS signals to a large area while rising upward and transmit GPS signals with a higher power level as a transmission distance between the reception areas and the antennas 50 is increased. For example, the upper antenna (e.g., 56) may transmit the GPS signal of the highest power level, the lower antenna (e.g., 54) may transmit the GPS signal of a lowest power level, and the middle antenna (e.g., 52) may transmit the GPS signal of a power level between the lowest and highest power levels. Alternately, a lower antenna rather than an upper antenna may transmit a wideband GPS signal with a high power level regardless of the height thereof.

Assuming that a reception area is divided into a weak reception area 11, a medium reception area 22, and a strong reception area 33, the multiple antennas 50 according to an exemplary embodiment of the inventive concept may include a weak power antenna 52 that wirelessly transmits a GPS signal with a weak power level, a medium power antenna 54 that wirelessly transmits a GPS signal with a medium power level, and a strong power antenna 56 that wirelessly transmits a GPS signal with a strong power level. In FIG. 2, three antennas are shown and the reception area is shown as being divided into a corresponding three areas. However, this is merely an example, as the reception area may be divided into four or more areas. For example, when the reception area is divided into n areas, n annular antennas may be provided. The pseudo-satellite transmitter may transmit reception signals with a power ranging from about −120 dBm to about −130 dBm in the overall reception area.

Therefore, the multiple antennas 50 according to the embodiment of the inventive concept shown in FIG. 2 may transmit GPS signals with a uniform intensity to a wide shadow area, which may be difficult for satellite signals output from a space-based satellite 60 to reach.

Figure 3:
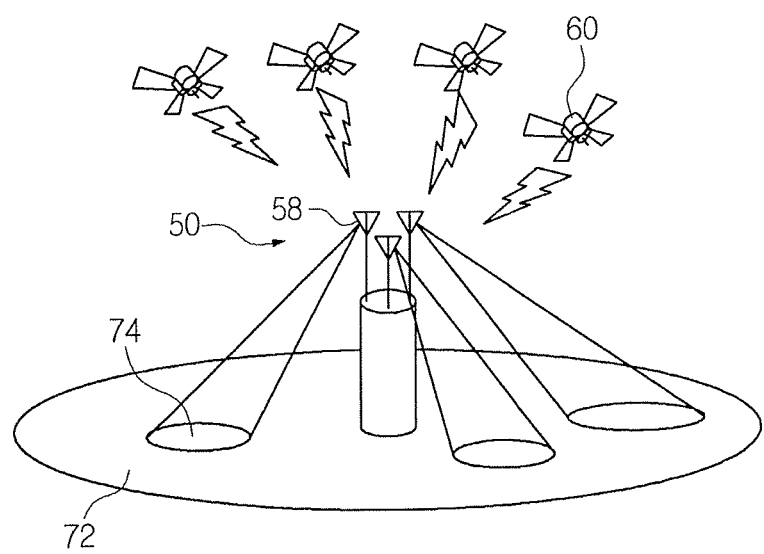
FIG. 3 is a diagram illustrating the operation of multiple antennas according to an exemplary embodiment of the inventive concept.

FIG. 3 is a diagram illustrating the operation of multiple antennas 50 according to an exemplary embodiment of the inventive concept. The multiple antennas 50 are directional antennas (e.g., 58). Referring to FIG. 3, directional antenna 58 of the multiple antennas 50 according to an embodiment of the inventive concept transmits GPS signals with different power levels to a GPS shadow area 74. GPS signals from a space-based satellite 60 are receivable in the local GPS shadow area 74, while GPS signals from the other space-based satellites 70 may not be receivable in the local GPS shadow area 74.

In an environment, such as a city, the GPS shadow area 74 appears in a portion of a GPS receivable area 72. When a pseudo-satellite GPS signal is transmitted only to the GPS shadow area 74, the GPS shadow area 74 can use the pseudo-satellite GPS signal, and thus it may be possible to prevent interference between the signals transmitted from the pseudo-satellite transmitter to the GPS shadow area and signals transmitted from the space-based satellite 60 to the GPS receivable area 72.

The other directional antennas illustrated in FIG. 3 of the multiple antennas 50 (e.g., see other diamonds) function in a similar manner to the above described directional antenna 58. For example, each other directional antenna transmits GPS signals of different power levels to corresponding local shadow areas as shown in FIG. 3. Therefore, the multiple antennas 50 according to an exemplary embodiment of the inventive concept shown in FIG. 3 may enable a GPS receiver to receive GPS signals with the same or similar reception power in a local GPS shadow area where satellite signals from a space-based satellite 60 cannot reach.

Therefore, the pseudo-satellite transmitter according to embodiments of the inventive concept may use the multiple antennas 50 according to FIG. 2 or FIG. 3 to enable a GPS receiver to receive GPS signals with the same or similar power in near and far reception areas or a local GPS shadow area.

A method of transmitting GPS signals using a pseudo-satellite transmitter having the above-mentioned structure according to an exemplary embodiment of the inventive concept will be described below. In a method of transmitting GPS signals using a pseudo-satellite transmitter according to an exemplary embodiment of the inventive concept, an area in which the multiple antennas 50 transmit signals is divided into a plurality of reception areas at a predetermined distance interval from the transmission position of the multiple antennas. The electric field intensities of the signals transmitted to the reception areas are controlled to be equal or similar to each other. In this way, the interference between the GPS signals may be reduced. In addition, transmitting GPS signals only to the GPS shadow area may reduce signal interference in a GPS receivable area.

Figure 4:
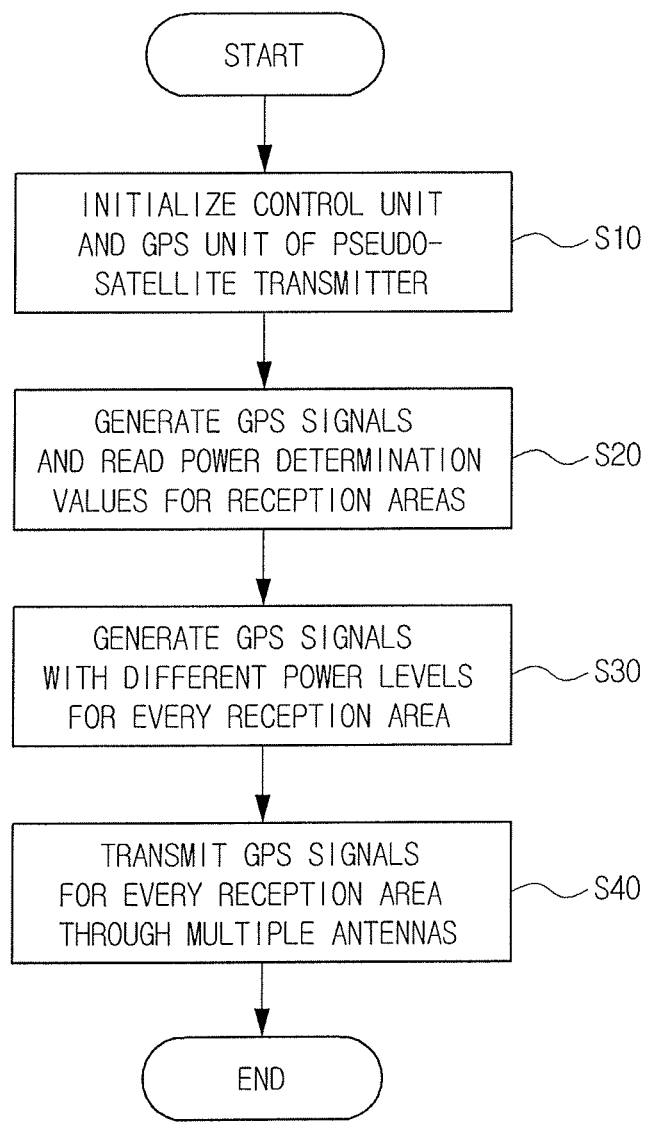
FIG. 4 is a flowchart illustrating a method of transmitting GPS signals using the pseudo-satellite transmitter according to an exemplary embodiment of the inventive concept.

FIG. 4 is a flowchart illustrating a method of transmitting GPS signals using a pseudo-satellite transmitter according to an exemplary embodiment of the inventive concept. As shown in FIG. 4, in the method of transmitting GPS signals using the pseudo-satellite transmitter according to an exemplary embodiment of the inventive concept, the control unit 10 and the GPS unit 20 of the pseudo-satellite transmitter are initialized if necessary (S10). For example, step S10 may be skipped if the control unit 10 and the GPS unit 20 were previously initialized.

After the control unit 10 and the GPS unit 20 of the pseudo-satellite transmitter are initialized, the GPS unit 20 generates one or more GPS signals and power determination values for the reception areas stored in a memory are read (S20). The GPS unit 20 may generate the GPS signals in response to a control signal from control unit 10. The GPS unit 20 may read the values from its' own memory or a memory of the pseudo-satellite transmitter. The GPS unit 20 may send these values to the transmission power control unit 40. Alternately the transmission power control unit 40 may read the values from the memory.

The transmission power control unit 40 generates GPS signals with different power levels for the reception areas based on one or more GPS signals generated by the GPS unit 20 and the power determination values (S30). The number of reception areas may be n (e.g., a positive integer) and a GPS signal having an optimal power level (e.g., ranging between a weak level to a strong level) may be applied to each of the reception areas according to a distance between pseudo-satellite transmitter or an antenna thereof and a corresponding reception area.

The GPS signals with different power levels for the reception areas, which are generated in Step S30, are transmitted to each reception area through the multiple antennas 50 (S40). A GPS receiver in each reception area may receive GPS signals with the same or similar power level transmitted through the multiple antennas 50.

While exemplary embodiments of the inventive concept have been shown and described with reference to FIGS. 1 to 4, it will be understood by one of ordinary skill in the art that various changes in form and details may be made therein without departing from the spirit and scope of the disclosure.

What is claimed is:

1. A method of transmitting GPS signals of a pseudo-satellite, comprising:
    enabling a GPS unit of a pseudo-satellite transmitter to generate a GPS signal;
    enabling a transmission power control unit to generate a plurality of GPS signals with different power levels based on the GPS signal and power determination values of a plurality of reception areas; and
    transmitting the GPS signals with different power levels to the plurality of reception areas through a plurality of different antennas.

2. The method of claim 1, wherein plurality of antennas are co-located in a lateral direction over a common transmission position and the reception areas are annular and arranged concentrically around the common transmission position.

3. The method of claim 2, wherein the antennas are co-located in a lateral direction over the transmission position.

4. The method of claim 2, wherein the transmitting comprises transmitting a GPS signal of the plurality of GPS signals having the lowest power level to the reception area of lowest area, and transmitting each subsequent GPS signal of a next higher power level to the next reception area of the next higher area.

5. The method of claim 4, wherein the transmitting comprises transmitting all of the GPS signals by each directional antenna to a respective one of the reception areas.

6. The method of claim 1, wherein the antennas are directional antennas and the reception areas are annular and do not overlap with one another.

* * * * *